Patented Dec. 15, 1931

1,836,085

UNITED STATES PATENT OFFICE

GEORGES PATART, OF PARIS, FRANCE

METHOD FOR THE SIMULTANEOUS PRODUCTION OF METHYL ALCOHOL AND LIQUID HYDROCARBONS BY SYNTHESIS

No Drawing.   Application filed January 29, 1926.   Serial No. 84,770.

It has been already observed that small amounts of saturated hydrocarbons such as methane may be admitted in the composition of the gaseous mixtures containing carbon oxides and hydrogen and serving for the synthetic production of methanol and other organic compounds containing oxygen; but it has been thought heretofore that the nonsaturated hydrocarbons and the aromatic hydrocarbons should be eliminated from the gaseous mixture to be treated before submitting said mixture to the action of the catalyzer.

I have found, according to this invention, that the nonsaturated hydrocarbons or the armatic hydrocarbons which can be found in industrial gas mixtures such as coal distillation gas, or which are purposely mixed therewith, will not only not be prejudicial for the direct catalytic combination of carbon monoxide and hydrogen into methanol, but even seems to further the said combination. While the aromatic hydrocarbons are liquefied with the other condensation products, remaining nearly unaltered or after having been hydrogenated, the nonsaturated hydrocarbons are polymerized (or condensed) while partially combining with hydrogen and are transformed into liquid hydrocarbons which are nearly entirely saturated. This is a most surprising fact that the catalyzers which are the most suitable for the synthetic combination of hydrogen with carbon monoxide into organic compounds containing oxygen, are at the same time those by means of which the aromatic hydrocarbons and the nonsaturated hydrocarbons can be polymerized (or condensed) and combined with hydrogen in the most practical manner. The operation is performed as if these reactions, although of two different classes, had taken place simultaneously and independently of each other, without being detrimental to each other; it may even be observed that such conditions are rather favorable since the output of the reactions of each of these two classes taking place simultaneously as above said, is equal, and even superior, to what could be obtained by carrying out the reactions of one class separately and independently of the reactions of the other class, and respectively in the most favorable conditions for each class of reaction.

This invention thus consists in using for synthesizing methyl alcohol by a catalytic action under pressure upon a mixture of carbon oxides and hydrogen, a gas mixture containing the latter components together with nonsaturated hydrocarbons (ethylene, acetylen or homologous compounds) or aromatic hydrocarbons (benzene, toluene . . .), said hydrocarbons coming from the source of production of the gas mixture or being purposely added thereto.

*1st example.*—By mixing equal parts of Paris city gas as commonly used, and of industrial water gas, there is obtained a gas mixture having the following composition: $CO_2$, 3 per cent; $O_2$, 0.6 per cent; $C_2H_4$, 1.4 per cent; CO, 26 per cent; $H_2$, 54 per cent; $CH_4$, 8.9 per cent; $N_2$, 6 per cent.

This gas mixture is treated as follows: The said mixture is circulated for eight hours in a closed circuit, and at a pressure of 150–250 atm., upon a catalyzer consisting of a mixture of zinc oxide and chromium oxide obtained by reducing agglomerated basic chromate of zinc, and which is maintained at 300 degrees C.; the part of the gas entering into the reaction is periodically replaced by a like amount from the initial gas mixture; in these circumstances, I collect a homogeneous liquid by condensation and cooling, while maintaining the pressure. The said liquid, when diluted with water, will separate into two layers. The upper layer, consisting of hydrocarbons, represents some 2.5 per cent of the total amount; the lower layer consists of methanol in the practically pure state, diluted with water.

On the other hand, the final composition of the circulated gas is as follows:

$CO_2$, 1.2 per cent; $O_2$, 0 per cent; $C_2H_4$, 2.2 per cent; CO, 27.2 per cent; $H_2$, 16.7 per cent; $CH_4$, 27.3 per cent; $N_2$, 25.4 per cent.

In consideration of the relative variations of the percentage of methane and nitrogen—which latter may be considered as inert—it will result that more than 25 per cent of the methane enters into the reaction in order to furnish a portion of one or the other of the resulting liquid compounds, so that methane can thus be utilized (and this use could likely be increased by continuing the operation under an increased total pressure) for the production of liquid carbon compounds, with the carbon contained in one or the other of the gases employed.

It has been further observed that towards the end of the operation, and during the last hour of operation, the production of methanol is scarcely reduced, whilst the partial pressure of hydrogen in the gas mixture subjected to catalysis is hardly over 34 atm. So that when operating at a total pressure of 800–1000 atm. the operation can be continued with a satisfactory output until the percentage of hydrogen in the mixture is reduced to 4 or 5 per cent.

*2nd example.*—By adding ethylen and hydrogen to "water gas" of normal industrial composition, there is obtained a gaseous mixture containing, by volume 23 per cent of ethylene, 22 per cent of carbon monoxide, 49.3 per cent of hydrogen, 1.2 per cent of carbon dioxide, 0.5 of oxygen and 4 per cent of nitrogen. The said mixture is circulated, in a closed circuit, and under a pressure of 150–200 atmospheres, upon a catalytic mass consisting of a basic chromate of zinc which is formed into grains by agglomeration and is preliminarily reduced in the reaction chamber itself by a current of pure hydrogen or by the gas mixture which is to be treated. The temperature of the reaction chamber is maintained at about 300 degrees C. The gas mixture, which is cooled in a certain part of the circuit, is partly condensed in a liquid which separates by its own means into two layers. The upper layer—which represents about ¼ of the total amount of the liquid—consists solely of a mixture of hydrocarbons showing the fluorescence which characterizes the major part of the petroleum products; its specific gravity is 0.735 at 15 degrees C. This product when simply filtered, constitutes an excellent fuel for internal combustion engines such as aeroplane or motor vehicle engines. The lower layer, whose specific gravity is 0.805 at 15 degrees C., is almost entirely distilled over between 66 and 68 degrees C. and consists of methyl alcohol in a practically pure state, which holds in solution only traces of hydrocarbons and very small quantities of aldehydes or higher alcohols which can be eliminated by a single distilling operation.

Even after a continuous operation for several days, no carbon deposit is formed upon the catalyzer nor in the reaction chamber.

During the continuous circulation upon the catalyzer, the composition of the gas mixture will not appreciably change as concerns ethylene, hydrogen and carbon monoxide, if due care is taken to replace by a portion of initial mixture the fraction of the gas mixture combined and eliminated in the liquid state. Only very small quantities of saturated gaseous hydrocarbons will be produced, these consisting chiefly of ethane, and they can be discharged concurrently with nitrogen, when the amount of this latter which accumulates in the circuit is such that it must be discharged.

In the above described first example the synthesis is continued by successive circulations upon the catalyzer and subsequent condensations, until the production of the liquid has fallen to a rate which is considered insufficient. The residual gas is now allowed to expand, with production of cold, by any known process, so as to liquefy the methane contained in the residual gas, whilst the other components of this gas remain in the gaseous state.

The methane is separately collected and is partially burned with practically pure oxygen as stated in my copending patent application entitled: "Method for the utilization of methane", Serial No. 84,772, filed January 29, 1926, which produces a mixture containing substantially 3 volumes of hydrogen for 2 volumes of carbon monoxide, this mixture being added to the original gas mixture in order to be again subjected to the catalytic action.

As to the part of the residual gas mixture which has not been liquefied, and which consists almost exclusively of hydrogen, nitrogen and carbon monoxide, the hydrogen can be separated therefrom by means known per se, and this hydrogen is also added to the gas mixture concerned in the reaction. I am thus enabled, after the continuous operation has lasted for a stated time to much reduce—and even, in certain cases, to eliminate—the use of specially prepared water gas in the preparation of the initial gas mixture and to operate only with coal gas.

As to the liquid product obtained by condensation, the pressure, being still maintained, it consists of slightly hydrated methanol having hydrocarbons in solution; it may be employed without further treatment for heating purposes or for carburetion; in other cases the hydrocarbon can be separated therefrom by decantation, after adding water, and the aqueous solution of methanol, when distilled, will furnish pure methyl alcohol.

The invention thus permits of directly using coal distillation gas, after only tars and ammonia have been eliminated therefrom, as an additional source of the hydrogen to be added to water gas, in order to obtain gas mixtures by means of which methyl alcohol can be synthesized. When nonsaturated gaseous hydrocarbons, mixed with other gases or not, are available, the invention also affords of wholly transforming, at a small cost, these gaseous hydrocarbons into liquid hydrocarbons which are, for the major part, saturated hydrocarbons.

Having now described my invention, what I claim as new and desire to secure by Letters Patent is:

1. In a method for the simultaneous production of methanol and liquid hydrocarbons, the step which comprises subjecting a gas mixture containing hydrogen, carbonic oxides and unsaturated hydrocarbons to the action of a methanol-forming catalyzer under a pressure and a temperature known to be suitable for the catalytic production of methanol from carbonic oxides and hydrogen.

2. In a method for the simultaneous production of methanol and liquid hydrocarbons, the step which comprises subjecting a gas mixture containing hydrogen, carbonic oxides and aromatic hydrocarbons to the action of a methanol-forming catalyzer under a pressure and a temperature known to be suitable for the catalytic production of methanol from carbonic oxides and hydrogen.

3. In a method for the simultaneous production of methanol and liquid hydrocarbons, the step which comprises subjecting a gas mixture containing hydrogen, carbonic oxides, unsaturated hydrocarbons and aromatic hydrocarbons to the action of a methanol-forming catalyzer under a pressure and a temperature known to be suitable for the catalytic production of methanol from carbonic oxides and hydrogen.

4. In a method for the simultaneous production of methanol and liquid hydrocarbons, the steps which comprise mixing a gas mixture containing hydrogen and carbonic oxides with a gas mixture containing gaseous unsaturated hydrocarbons, then subjecting the resultant gas mixture to the action of a methanol-forming catalyst, under a pressure and a temperature known to be suitable for the catalytic production of methanol from carbonic oxides and hydrogen.

5. In a method for the simultaneous production of methanol and liquid hydrocarbons, the steps which comprise mixing a gas mixture containing hydrogen and carbonic oxides with an industrial coal distillation gas still containing the unsaturated hydrocarbons and the aromatic hydrocarbons produced therewith, then subjecting the resultant gas mixture to the action of a methanol-forming catalyst, under a pressure and a temperature known to be suitable for the catalytic production of methanol from carbonic oxides and hydrogen.

6. In a method for the simultaneous production of methanol and liquid hydrocarbons, the step which comprises subjecting a mixture of water gas and unsaturated hydrocarbons to the action of a methanol-forming catalyst under a pressure and a temperature known to be suitable for the catalytic production of methanol from carbonic oxides and hydrogen.

7. In a method for the simultaneous production of methanol and liquid hydrocarbons, the step which comprises subjecting a gas mixture formed of equal parts by volume of water gas and coke oven gas, both gases having their normal industrially composition, to the action of a methanol-forming catalyst under a pressure and a temperature known to be suitable for the catalytic production of methanol from carbonic oxides and hydrogen.

8. In a method for the simultaneous production of methanol and liquid hydrocarbons, the steps which comprise originally mixing an initial gas mixture containing hydrogen and carbon oxides with a gas mixture containing unsaturated hydrocarbons, subjecting the resulting gas mixture several times and successively to the action of a methanol-forming catalyst under a pressure and a temperature known to be suitable for the catalytic production of methanol from carbonic oxides and hydrogen, condensing the methane contained in the residual gas, effecting an incomplete combustion of said methane so as to obtain a mixture of carbon monoxide and hydrogen, and substituting some of the two latter gases and the gas remaining after the condensation of the methane for said initial gas mixture.

In testimony whereof I have signed my name to this specification.

GEORGES PATART.